United States Patent [19]
Vranish

[11] Patent Number: 5,261,758
[45] Date of Patent: *Nov. 16, 1993

[54] SPLIT SPLINE SCREW

[75] Inventor: John M. Vranish, Crofton, Md.

[73] Assignee: The United States of America as represented by the Administrator of the National Aeronautics and Space Administration, Washington, D.C.

[*] Notice: The portion of the term of this patent subsequent to Dec. 29, 2009 has been disclaimed.

[21] Appl. No.: 918,747

[22] Filed: Jul. 27, 1992

[51] Int. Cl.⁵ .......................... F16B 3/00; B25J 11/00
[52] U.S. Cl. .................................. 403/348; 403/359; 901/30
[58] Field of Search .................. 403/349, 359, 348; 279/93; 408/239 A; 901/30

[56] References Cited

U.S. PATENT DOCUMENTS

| | | | |
|---|---|---|---|
| 531,334 | 12/1894 | Ross | 403/348 X |
| 4,538,967 | 9/1985 | Furukawa | 403/349 X |
| 4,635,328 | 1/1987 | Palmer | 29/26 A |
| 4,710,093 | 12/1987 | Zimmer et al. | 414/730 |
| 4,756,638 | 7/1988 | Neyret | 403/349 X |
| 4,875,275 | 10/1989 | Hutchinson et al. | 29/568 |
| 5,018,266 | 5/1991 | Hutchinson et al. | 29/568 |
| 5,174,772 | 12/1992 | Vranish | 439/131 |

Primary Examiner—Randolph A. Reese
Assistant Examiner—Christopher J. Novosad
Attorney, Agent, or Firm—Paul S. Clohan, Jr.; R. Dennis Marchant; Guy M. Miller

[57] ABSTRACT

A split spline screw type payload fastener assembly including three identical male and female type split spline sections. The male spline sections are formed on the head of a male type spline driver. Each of the split male type spline sections have an outwardly projecting load baring segment including a convex upper surface which is adapted to engage a complementary concave surface of a female spline receptor in the form of a hollow bolt head. Additionally, the male spline section also includes a horizontal spline releasing segment and a spline tightening segment below each load bearing segment. The spline tightening segment consists of a vertical web of constant thickness, having at least one flat vertical wall surface which is designed to contact a generally flat vertically extending wall surface tab of the bolt head. Mutual interlocking and unlocking of the male and female splines result upon clockwise and counter clockwise turning of the driver element.

13 Claims, 3 Drawing Sheets

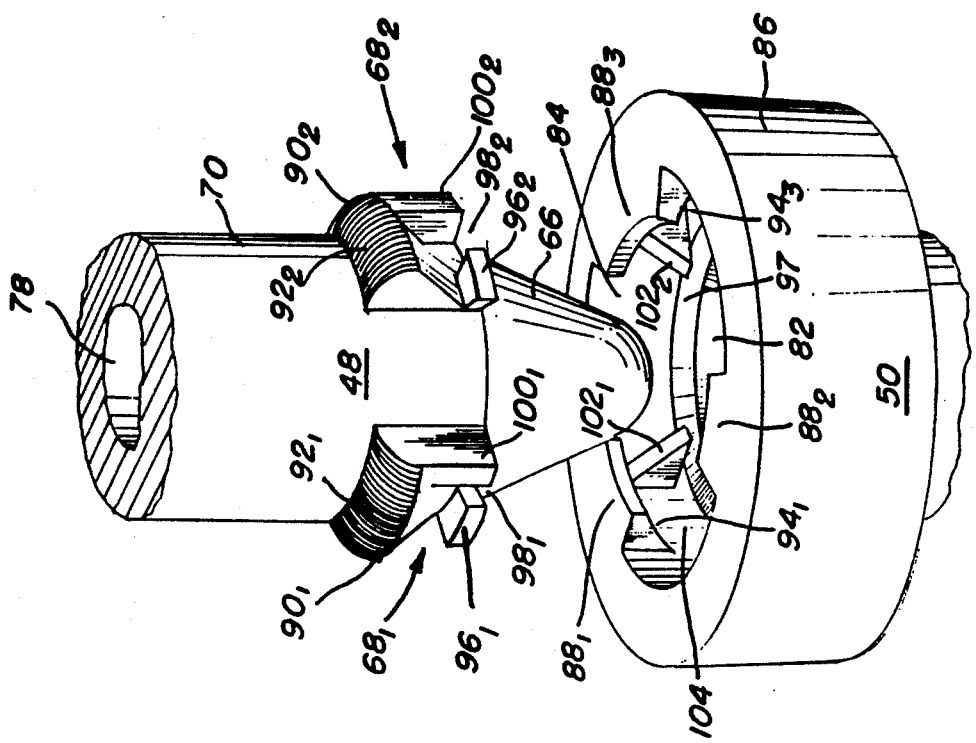
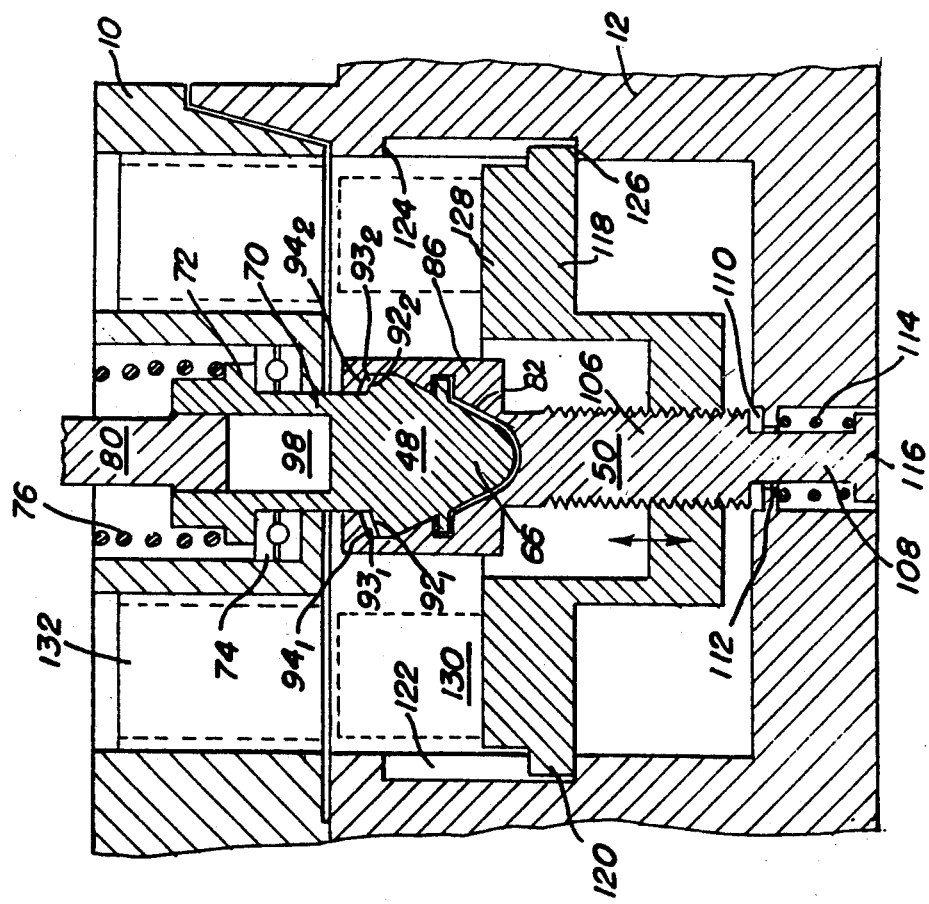

SPLIT SPLINE SCREW

ORIGIN OF THE INVENTION

This invention was made by an employee of the United States Government and may be used by or for the Government for governmental purposes without the payment of any royalties thereon or therefor.

CROSS REFERENCE TO RELATED APPLICATIONS

This invention is related to an invention shown and described in U.S. Pat. No. 5,174,772 dated Dec. 29, 1992, entitled "Work Attachment Mechanism/Work Attachment Fixture", filed in the name of John M. Vranish on Jan. 22, 1992. This invention is assigned to the assignee of the present invention. Moreover, the teachings of this related invention is herein meant to be incorporated by reference.

BACKGROUND OF THE INVENTION

This invention relates generally to attachment means for joining two bodies together, and more particularly to a spline type fastener for joining two bodies together, for example, in outer space.

DESCRIPTION OF THE PRIOR ART

Fasteners utilized to attach and release structural elements by means of a robot are generally known. In an environment where payloads are required to be attached to and released from a spacecraft, for example, payload fasteners have special requirements, irrespective of whether the attachment is made by way of a robot or an astronaut. The fastener should be designed, for example, so that it cannot be cross threaded, it cannot be loosened by launch vibrations, and must be able to be preloaded with modest torque against multiple "G" launch loads.

One such fastener is comprised of a spring-loaded male spline nut located at the tip of a threaded male positioning member that is affixed to a body being fastened. A complementary female type spline fitting or bolt adapted to engage the spline nut is located at the lower end of a female conical receiving member which is affixed to a structure or receiving body to which the payload body is being fastened. During a fastening guidance and mating procedure, the male nut and female bolt are aligned in a soft docking phase which is followed by a forward movement of the spline nut against and into the female spline member. This is then followed by a rotation of the male spline nut into a locking arrangement with the female spline fitting. To release the fastener, the process is simply reversed.

While this system operates as intended, undesired stresses can build up and accumulate in the locking splines. Accordingly the present invention is directed to a technique to reduce these stresses, thus significantly improving the performance and safety of the system without a significant increase in size.

SUMMARY

Accordingly, it is an object of the present invention to provide an improved fastener device which may be repeatedly applied and removed by a machine.

It is a further object of the invention to provide an improved fastener device which can be automated for use in connection with a robot.

It is still another object of the invention to provide a relatively simple, compact and lightweight fastener device for spacecraft payloads which can be attached and released by a robot as well as an astronaut.

And still a further object of the invention is to provide an improved spline type fastener for payload fastener which can be attached and released by both a robot and an astronaut.

The foregoing and other objects of the invention are realized by a split spline screw type payload fastener assembly comprised of three identical male type split spline sections formed on the head of a male type spline driver and wherein each of the split spline sections include an outwardly projecting load bearing segment having a convex upper surface which is adapted to engage a complementary concave surface of a female spline receptor in the form of a bolt head. The male spline section also includes a horizontal spline releasing segment below each load bearing segment and having flat upper and lower surfaces and a curved outer surface and spline tightening segment consisting of a vertical web of constant thickness toward one side of the load bearing segment and having at least one flat vertical wall surface which is designed to contact a generally flat vertically extending wall surface tab of the bolt head. Mutual interlocking and unlocking of the male and female splines result upon clockwise and counter clockwise turning of the driver element.

BRIEF DESCRIPTION OF THE DRAWINGS

The following detailed description of the invention will be more readily understood when considered in conjunction with the accompanying drawings in which:

FIG. 2 is a partial central cross sectional view of the split, spline screw system used to couple the two bodies shown in FIG. 1;

FIG. 3 is an enlarged cutaway view of the split, spline screw system shown in FIG. 2;

DETAILED DESCRIPTION OF THE INVENTION

Figure 1:
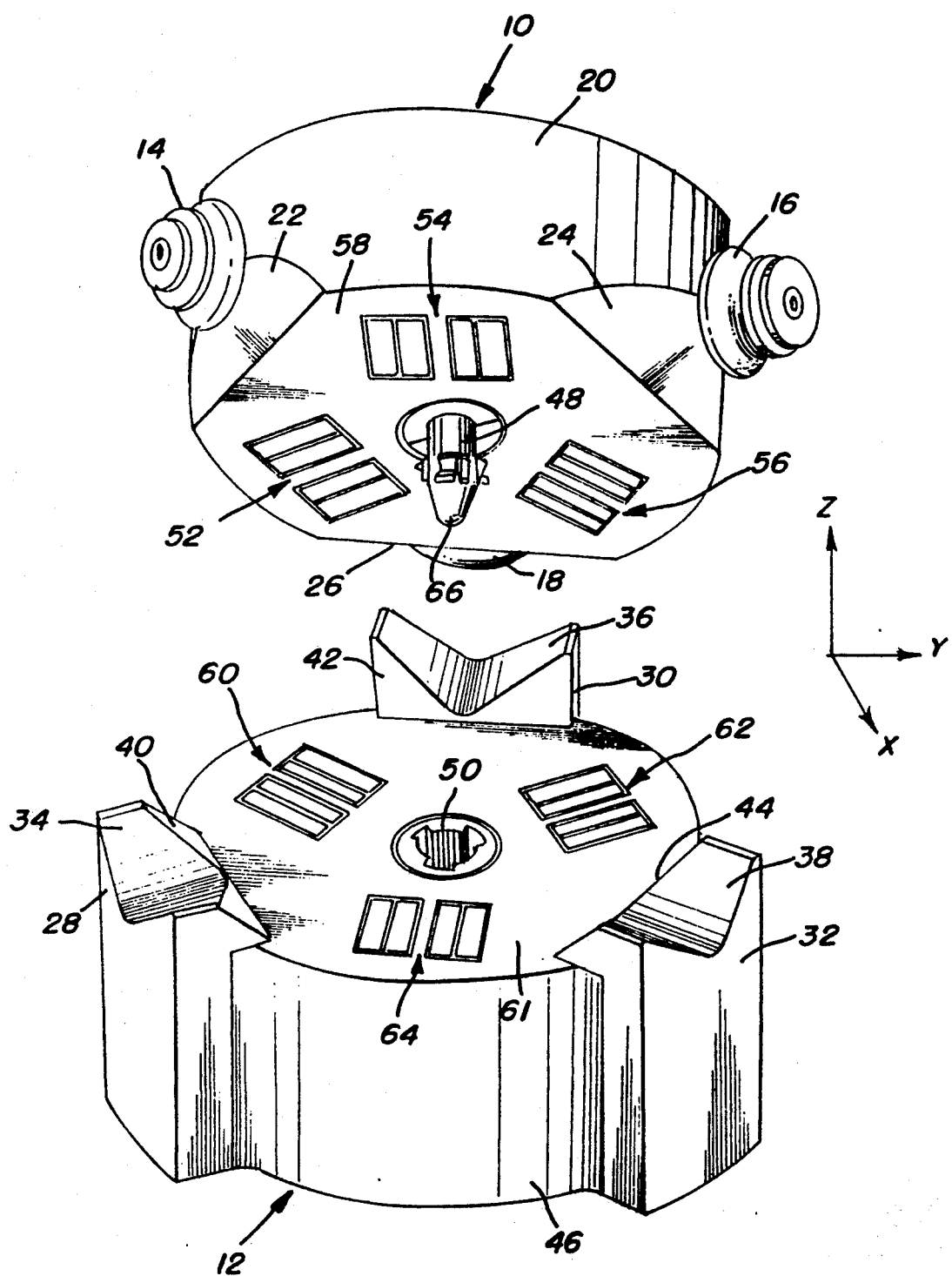
FIG. 1 is a perspective view of a work attachment mechanism body approaching a work attachment fixture body in a berthing maneuver.
Figure 5:
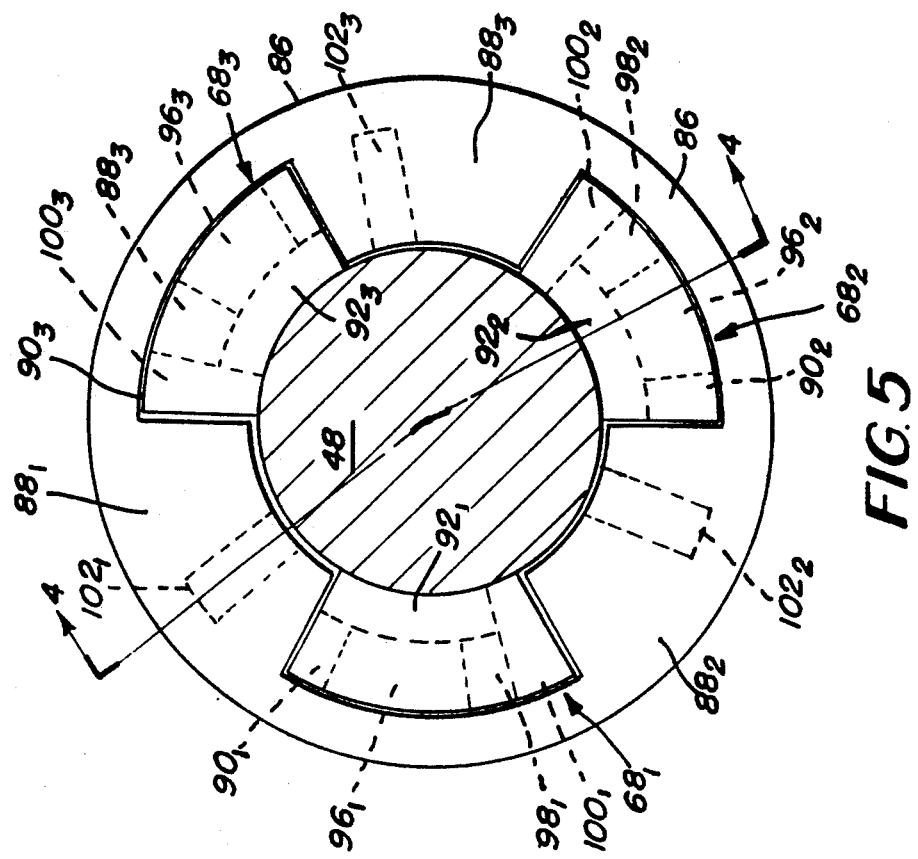
FIG. 5 is a transverse section of the split, spline screw system shown in FIG. 4 taken along the lines 5—5 thereof.
Figure 4:
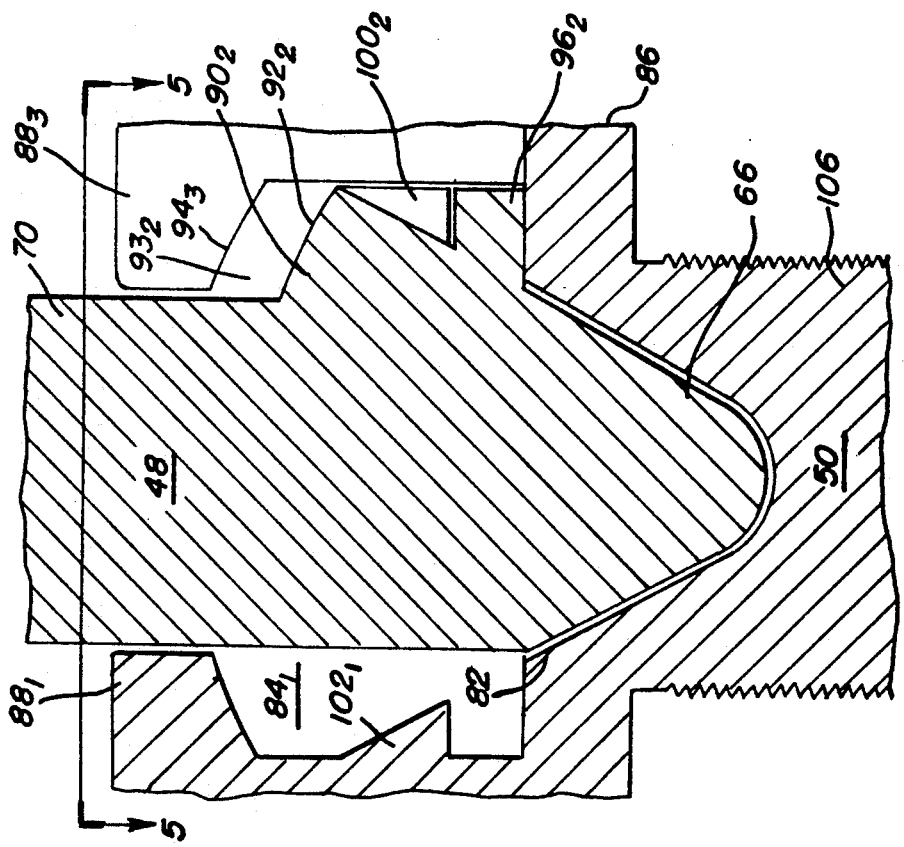
FIG. 4 is an enlarged partial central cross sectional view of the split, spline screw system shown in FIGS. 2 and 3 and taken along the lines 4—4 of FIG. 5.

Referring now to the drawings wherein like reference numerals refer to like parts throughout, reference will be first made to FIG. 1 where there is disclosed two generally cylindrical bodies, a work attachment mechanism (WAM) 10 which is attached to the arm of a robot, not shown, and the other a work attachment fixture (WAF) 12 which is attached to a work site, for example, in outer space also not shown. In a berthing and attachment sequence between the bodies, the work attachment mechanism 10 is first positioned in the vicinity of the work attachment fixture 12 for docking by means of a remote manipulator system which may be located, for example, on a space station.

As an adjunct in the docking process, an automatic alignment system for the two bodies 10 and 12 includes three equally spaced round roller type members 14, 16 and 18 which are rotatably mounted on the cylindrical outer surface 20 of the work attachment mechanism 10 adjacent respective leading chamfered surfaces 22, 24 and 26. The work attachment fixture 12 below includes a complementary mating structure comprised of three mounting blocks 28, 30 and 32 having upwardly directed V-shaped grooves 34, 36 and 38 which are coextensive with adjacent chamfered surfaces 40, 42 and 44. As shown, the mating blocks 28, 30 and 32 are equidistantly arranged on the outer surface 46 of the work attachment fixture 12 to match the separation of the roller members 14, 16 and 18.

In a docking maneuver, one or more of the roller members 14, 16 and 18 of the work attachment mechanism 10 first contact a respective outwardly radiating V-shaped mating groove 34, 36, 38 of the work attachment fixture 12. This provides an automatic alignment capability for a spline screw coupling and locking mechanism for the two bodies 10 and 12 and consisting of a male type split spline driver element 48, and a female spline type receptor element 50, which comprises the subject matter of this invention.

Surrounding the spline connector elements 48 and 50 are three sets of fold back door type dust covers 52, 54 and 56, which are located on the underside 58 of the work attachment mechanism 10 and three mutually opposite sets of dust covers 60, 62 and 64 located on the upper surface 61 of the work attachment fixture 12. The dust covers 52, 54, 56 and 60, 62, 64 automatically open and close to protect complementary sets of electrical connectors, not shown, in order to provide an electrical interface between the bodies 10 and 12 for the transfer of power and electrical signals therebetween.

Referring now collectively to FIGS. 2 through 5, FIG. 2 is illustrative of a vertical cross section of the preferred embodiment of the invention including, among other things, the male split spline driver 48 and the female spline receptor element 50. As further shown in FIG. 3, the driver element 48 includes an alignment cone 66 behind which are located three identical male spline sections $68_1 \ldots 68_3$, two of which, $68_1$ and $68_2$, are shown. These spline sections are formed on the outer surface of a hollow shank 70 which includes a shoulder 72 (FIG. 2) that abuts a thrust bearing 74 and a compliance spring 76. The shank 70 includes an axial bore 78 which is adapted to receive a splined shaft 80 of a drive motor, not shown.

As shown in FIGS. 2 and 3, the alignment cone 66 is adapted to seat in a conical recess 82 located in inner cavity 84 of a female spline bolt head 86 which forms part of the receptor element 50 and includes three spline elements $88_1$, $88_2$ and $88_3$ at the top thereof. Each of the male spline sections $68_1 \ldots 68_3$ is comprised of an upper outwardly projecting spline segment $90_1 \ldots 90_3$ having a convex upper load bearing surface $92_1 \ldots 92_3$ which matches the undersurfaces $94_1 \ldots 94_3$ of the female spline sections $88_1$, $88_2$ and $88_3$. At the bottom of each load bearing spline segment $90_1 \ldots 90_3$, there is located a horizontally oriented flat spline releasing segment $96_1 \ldots 96_3$ which are adapted to contact an annular depth and tilt alignment surface 97 within the cavity 84 of the spline bolt head 86. Each male spline section $68_1 \ldots 68_3$ includes a third spline segment $100_1 \ldots 100_3$ used for tightening the male and female splines and comprises a vertical web separated from the respective releasing spline segment $96_1 \ldots 96_3$ and having at least one flat vertical wall surface which is designed to contact a generally flat wall surface of one of three like inwardly projecting bolt torque tabs $102_1 \ldots 102_3$, two of which $102_1$ and $102_2$, are depicted in FIG. 3 formed on the inner surface 104 of the female spline bolt 86.

Before describing the operation of the male and female spline elements $68_1 \ldots 68_3$ and $88_1 \ldots 88_3$, the remaining structure illustrated in FIG. 2 will first be considered. As shown in FIG. 2, the female spline bolt head 86 is joined to a threaded shank 106 which narrows at its lower end 108 where it passes through a recess 110 and hole 112 in the bottom of the work attachment fixture 12 where it is surrounded by preload spring 114 and is held in place by an enlarged butt end portion 116.

A captured nut body member 118 is located on the threaded shank 106. The nut member 118 is permitted to move axially up and down the bolt shank 106, but is constrained from rotation by one or more spline guides 120 which ride up and down in respective vertical channels 122 between top and bottom shoulder stops 124 and 126. The nut body 118 is shown comprised of an angulated member having an upper surface 128 on which is located a set of, for example, male type electrical connectors 130, shown in phantom view, around the periphery thereof and which are adapted to engage a respective set of female type electrical connectors 132, also shown in phantom view, located directly above in the work attachment mechanism 10. Associated with both sets of electrical connectors 130 and 132 are respective sets of dust covers 52, 54, 56 and 60, 62, 64, as shown in FIG. 1. The dust covers are adapted to open and close automatically when the electrical connectors are brought together upon docking of the two bodies 10 and 12.

In operation, as soon as the two bodies 10 and 12 have seated as shown in FIG. 2, the spring loaded male spline driver 48 drops down into the cavity 84 of the female spline bolt head 86, thereby creating a soft dock condition.

When the male spline driver 48 is rotated clockwise, the flat vertical wall surfaces $100_1 \ldots 100_3$ of the three male spline sections $68_1$, $68_2$ and $68_3$ hit the flat wall surfaces of the respective torque tabs $102_1$, $102_2$ and $102_3$ inside of the spline bolt head 86. The bolt shank 106, however, is spring loaded against the body 12 by the spring 114. Since the threaded nut member 118 cannot rotate, the structural arrangement depicted causes the nut member 118 to remain in place while the bolt shank 106 and the bolt head 86 translate downward until the gap $93_2$ (FIG. 4) is closed and the spline surfaces $92_1 \ldots 92_3$ and $94_1 \ldots 94_3$ lock. When this occurs, the spring load shifts from the bottom of the nut 118 to the convex surfaces $92_1 \ldots 92_3$. At that point the bolt 50 can no longer translate downwardly. Accordingly, the nut 118 begins to travel upwardly as indicated in FIG. 2.

The spline structure disclosed herein results in a significant difference in the load bearing and safety capabilities of this type of system. The top male and female spline segments $90_1 \ldots 90_3$ and $88_1 \ldots 88_3$, respectively, attend to the main tensile forces, while the bottom segments thereof, i.e. segments $100_1 \ldots 100_3$, $96_1 \ldots 96_3$ and $102_1 \ldots 102_3$ attend to torquing and detorquing forces.

The spherical bearing surfaces $92_1 \ldots 92_3$ and $94_1 \ldots 94_3$ yield relatively larger shear plane lengths and greater shear plane area which further strengthen the system. The bottom segments also provide a desired positioning sequence to permit soft docking between the bodies 10 and 12 throughout a fastening and unfastening process.

In the arrangement as shown, the spline segments $90_1 \ldots 90_3$, which are load bearing members, are optimized for the load bearing function and act to reduce contact stresses by virtue of their respective upper spherical surfaces $92_1 \ldots 92_3$. This permits tiny seating adjustments between the driver 48 and the receptor 50 such that when one of the three lower spline segments $96_1 \ldots 96_3$ make contact with the alignment surface 98 during the tightening or preload process, the top spline segments $90_1 \ldots 90_3$ are free to pivot in the manner of a ball and a socket. This then permits force equilibrium to occur in which simultaneously each of the lower spline segments $100_1 \ldots 100_3$ bears one third of the tightening forces, while each of the upper spline segments $90_1 \ldots 90_3$ bear one third of the actual load forces.

When the split spline fastening system of the subject invention encounters large stresses in usage, the male and female type spline elements $68_1 \ldots 68_3$ and $88_1 \ldots 88_3$ have already been optimally positioned with respect to each other during the tightening process so these large usage forces are evenly distributed, even though the splines cannot pivot under the large loads. During the loosening process, the locking splines are initially held together with friction between the load bearing spline surfaces $92_1 \ldots 92_3$ and $94_1$ and $94_3$ so the initial loosening forces are evenly distributed, even though the splines cannot pivot with respect to each other. As the female spline member 50 loosens, the friction forces recede and the spline member 50 slips slightly in rotation with respect to the driver member 48 until the back side of the three bolt torque tabs $102_1 \ldots 102_3$ encounter the spline releasing segments $96_1 \ldots 96_3$ and the two members 48 and 50 once again rotate in unison with the loosening process continuing. But now pivoting can occur between the upper and lower spline surfaces $92_1$ and $92_3$ and $94_1$ and $94_3$ so that the forces on the spline members go into force equilibrium, with each sharing one third of the force induced by the loosening torque. This condition continues until the two members 48 and 50 are ready for separation.

The torquing and position control splines $96_1 \ldots 96_3$, and $100_1 \ldots 100_3$ are optimized solely for the functions described below. First, they must transmit torque from the driver 48. Second, they must position the load bearing splines $90_1 \ldots 90_3$ and $88_1 \ldots 88_3$ of both the driver 48 and receptor 50 so that they line up with each other during tightening so as to produce maximum holding and preload forces and thereafter disengage the load bearing splines and permit easy separation of driver 48 and receptor 50 after the loosening process is complete. Third, they must provide a means of maintaining a soft or hard dock fastening status throughout both tightening and loosening to provide a hedge against inadvertent release It can be seen, particularly from FIG. 3, that the lower splines $88_1 \ldots 88_3$ in the coupling process are directly below the upper load bearing spline segments $90_1 \ldots 90_3$ so the end of the driver 48 will fit into the spline bolt head 86 through the bolt head's three minimum passage ways between the splines $88_1 \ldots 88_3$. Once the driver 48 enters the bolt head 86, the bottom spline segments $96_1 \ldots 96_3$ and $100_1 \ldots 100_3$ seat on the annular tilt and alignment surface 97 (FIG. 3) by spring loading, leaving a slight clearance (0.010 to 0.030 in.) between the lower spline segments $88_1 \ldots 88_3$ and the bolt torque tabs $102_1 \ldots 102_3$. Thus, when the driver 48 is turned clockwise (CW) to tighten, it will turn within the female spline bolt head 86 until one spline segment, e.g. $100_1$ contacts its corresponding bolt torque tab $102_1$.

Shortly thereafter the adjustment process between the driver 48 and bolt head 86 will continue until all three spline tightening segments $100_1 \ldots 100_3$ and bolt torque tabs $102_1 \ldots 102_3$ are engaged with equal forces. As the driver 48 and the bolt head 86 continue to turn clockwise together, the spring-loaded bolt shank 106 and bolt head 86 translate downwards relative to the driver 48 and each of the three bolt torque tabs $102_1 \ldots 102_3$ is captured in a slot $98_1 \ldots 98_3$ (FIG. 3) between the spline releasing segment $96_1 \ldots 96_3$ and spline tightening segments $100_1 \ldots 100_3$. And, as the clockwise rotation and relative translation continue, each of the three bolt torque tabs $102_1 \ldots 102_3$ continue to ride up its corresponding slot $98_1 \ldots 98_3$ until the load bearing splines $90_1 \ldots 90_3$ and $88_1 \ldots 88_3$ of driver and bolt lock.

When a counterclockwise rotation is initiated to loosen a previously fastened spline driver 48 and receptor 50, the contact between each bolt torque tab $102_1 \ldots 102_3$ and its corresponding lower spline releasing segment $96_1 \ldots 96_3$ couple these two mating parts together, both for transmitting torque and for maintaining hard-/soft dock throughout the loosening process. When the loosening process is complete, the respective elements of both of the driver 48 and the female receptor 50 are aligned so that as the counterclockwise motion continues, the driver 48 rotates within the bolt cavity 84 until the back side of the vertically oriented spine segments $100_1 \ldots 100_3$ hits an adjacent bolt torque tab $102_1 \ldots 102_3$. In the process, the female spline bolt 86 and driver 48 are positioned for easy disengagement and it is impossible for the two to get entangled or jammed together.

Having thus shown and described what is considered to be the preferred method and embodiment for implementing the subject invention, it is to be noted that the same has been made by way of illustration and not limitation. Accordingly, all modifications, alterations and changes coming within the spirit and scope of the invention are herein meant to be included.

I claim:

1. A split spline fastener system for mechanically and electrically coupling two bodies, comprising:
   a first body comprising a work attachment mechanism including male type spline connecting means selectively located thereon and having a plurality of first type spline sections located exteriorally on a forward end portion;
   a second body comprising a work attachment fixture, female type spline connecting means positioned thereon to mate with said male type spline connecting means and having a like plurality of second type spline sections located interiorally of said second body for engaging said first type spline sections;
   first type alignment means exteriorally located on said first body for berthing with said second body;
   second type alignment means exteriorally located on said second body for receiving said first type alignment means;
   said female type spline connecting means including a threaded bolt member having a captured nut member located thereon which can translate up and down the bolt but is constrained from rotation thereabout;
   said nut member having a mounting surface;
   at least one first type electrical connector located on said mounting surface for translating to and from said first body;

at least one complementary second type electrical connector on said first body for mating with said at least one first type electrical connector on the mounting surface of said nut member;

whereby when said male type spline connecting means mates with said female type connecting means and is driven, both said spline connecting means lock together and said nut member translates up the threaded bolt member carrying said first type electrical connector up to said complementary second type connector for interconnection therewith;

dust cover means located adjacent both said electrical connectors for protecting said connectors, said dust cover means operating to automatically open and shut in response to electrical connector translation;

each of said first type spline sections including at least one load bearing spline segment and at least one spline segment for tightening and releasing said male and female type spline connecting means;

each of said second type spline sections including at least one complementary load bearing spline segment contactable with said at least one load bearing spline segment and at least one other segment for engaging said at least one spline segment for tightening and releasing;

said load bearing spline segments including mutually complementary bearing surfaces comprising curvilinear bearing surfaces.

2. The spline fastener system of claim 1 and wherein said male type spline connecting means includes a conical male type end portion and said female type spline connecting means includes conical female type bottom portion for receiving and aligning said end portion of said male type spline connecting means.

3. The split spline fastener system of claim 2 wherein said first type spline sections are located adjacent said male type end portion.

4. The split spline fastener system of claim 1, wherein said first type spline sections respectively include one spline segment for tightening and one spline segment for releasing.

5. The split spline fastener system of claim 4 wherein said spline segments for tightening and releasing are located below said at least one load bearing segment.

6. The split spline fastener system of claim 5 wherein said spline segments for tightening and releasing are mutually separated for receiving therebetween said at least one other segment of said second type spline sections.

7. The split spline fastener system of claim 6 and wherein female type spline sections include a cavity for receiving said male type spline sections and said one other segment of said female type spline sections comprises a tab extending inwardly from a wall surface of said cavity.

8. The split spline fastener system of claim 7 wherein said cavity includes a flat annular surface intersecting said wall surface of said cavity and which is designed to provide a contact surface for said male type tightening and releasing spline segments.

9. The split spline fastener system of claim 8, wherein said tightening spline segment of said male type spline sections and said tab of said female type spline sections comprise members having mutually parallel contact surfaces.

10. The split spline fastener system of claim 9 wherein said releasing spline segment of said male type spline sections also includes a contact surface mutually parallel to said tab of said female type spline sections.

11. The split spline fastener system of claim 9 wherein said spline tightening segment and said tab comprises spline segments oriented in a first direction.

12. The split spline fastener system of claim 11 wherein said spline releasing segment comprises a spline segment oriented in a second direction substantially orthogonal to said first direction.

13. The split spline fastener system of claim 1 wherein said plurality of first and second type spline sections each comprises three sets of spline sections.

* * * * *